UNITED STATES PATENT OFFICE.

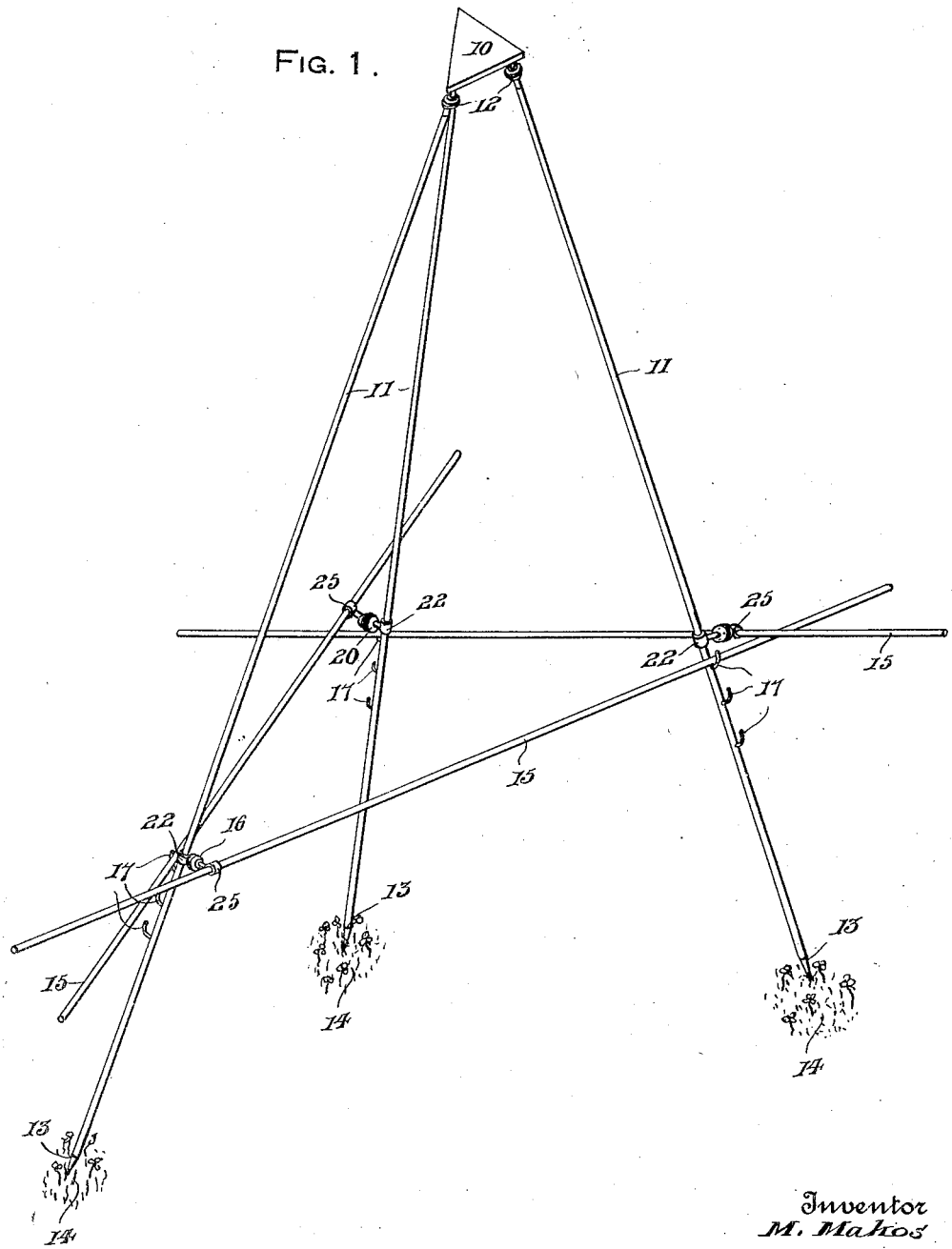

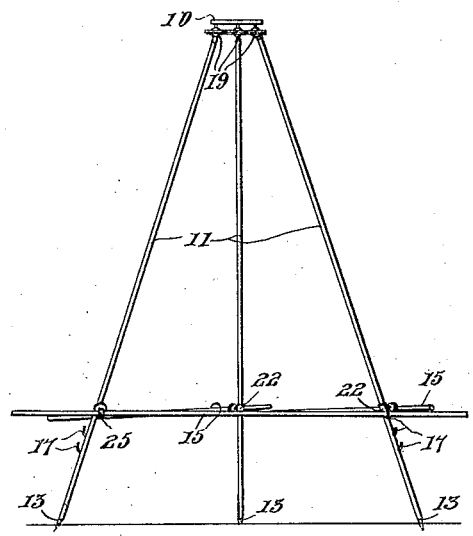
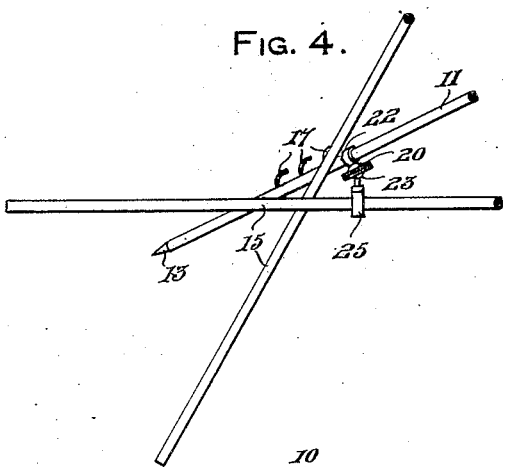
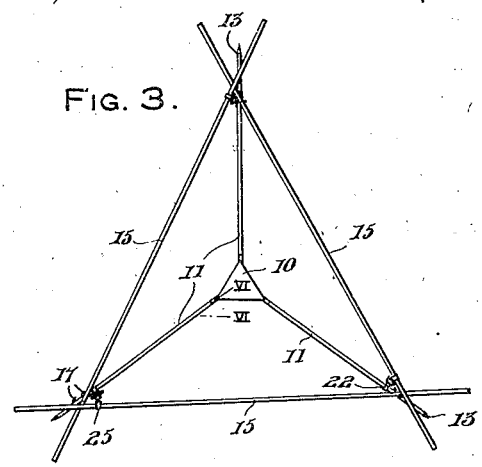
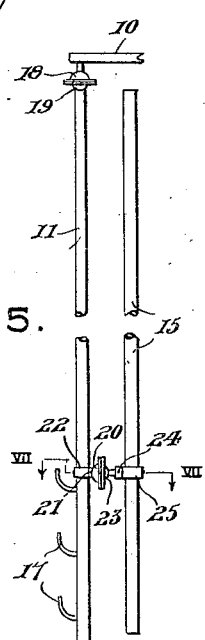
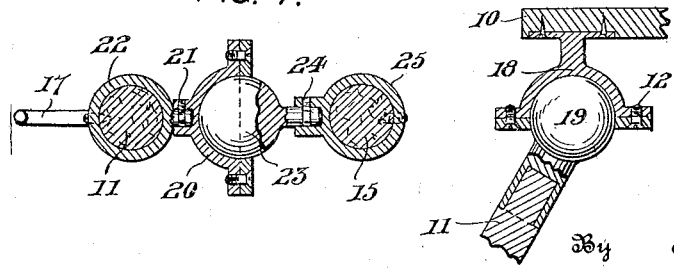

MICHAL MAKOS, OF CHICAGO, ILLINOIS.

HAY-DRYING DEVICE.

1,322,256.  Specification of Letters Patent.  Patented Nov. 18, 1919.

Application filed June 20, 1919. Serial No. 305,500.

*To all whom it may concern:*

Be it known that I, MICHAL MAKOS, a citizen of Poland, having declared my intention to become a citizen of the United States of America, residing at Chicago, in the county of Cook and State of Illinois, have invented certain new and useful Improvements in Hay-Drying Devices, of which the following is a specification.

The primary object of the invention is the provision of a hay drier foldable when not in use and readily set up in a field for supporting hay to be dried, the structure being easy and inexpensive to manufacture.

A further object of the invention is the provision of a holder for hay adapted for setting up at different adjustments and readily folded in compact manner when not in use, the invention being simple in construction and easily operated by a single workman.

With these general objects in view, the invention consists of the novel combination and arrangement of parts hereinafter fully described in connection with the accompanying drawings.

In the drawings forming a part of this application, like reference characters designate corresponding parts throughout the several views.

Figure 1 is a perspective view of the invention set up for use,

Fig. 2 is a side elevation thereof upon a reduced scale,

Fig. 3 is a top plan view of the same,

Fig. 4 is an enlarged elevational view of one corner of the device,

Fig. 5 shows a corner portion of the invention as arranged when folded with parts, broken away, Fig. 6 is an enlarged sectional view of one of the mounting joints taken on line VI—VI of Fig. 3, and Fig. 7 is a transverse sectional view of a connection employed, taken upon line VII—VII of Fig. 5.

My invention comprises a triangular plate 10 having three legs 11 pivotally mounted therebeneath by ball and socket joints 12 whereby the device may be set up after the nature of a tripod with the pointed lower ends 13 of the legs 11 depressed into the soil 14.

The joints 12 permit the adjustment of the tripod for positioning the plate 10 at the desired height with the tapered ends or feet 13 spaced apart any desired distance. Connecting straps 15 forming supports for the hay are pivoted to the legs 11 by ball and socket joints 16 whereby the struts 15 connect corresponding sides of the adjacently positioned legs 11, a plurality of hooks 17 upon each leg 11 beneath its joint 16 being provided for receiving the struts 15 as illustrated in Fig. 1 of the drawings.

Each joint 12 consists of a socket 18 carried by the plate 10 and a ball 19 upon the upper end of the adjacent leg 11 fitted for pivotal movement in the socket. The joint 16 comprises similar sockets 20 connected by a swivel joint 21 with a ring 22 fixed upon the adjacent leg 11 while a ball 23 fitted for turning in the socket 20 is connected by a swivel joint 24 with a ring 25 secured to the corresponding strut 15. The joints 12 permit the legs 11 to freely swing to desirable positions within the plate 10 while the joints 16 permit the struts 15 to freely swing upon the legs 11 from their inoperative position when folded alongside the adjacent legs to their outstretched positions seated upon the hook 17 when the invention is set up ready for use.

The complete operation of the invention will be apparent from this detailed description thereof, hay or any other material desired to be dried is spread over the plate 10, legs 11, and struts 15 and a large quantity of hay is supported elevated above the ground sufficiently to permit the free circulation of air for drying purposes. The free end portions of the struts 15 traverse the legs 11 at points beneath the opposite pivoted ends of the adjacent strut. A holder for hay is provided possessing great simplicity and easily set up and taken down while the same also possesses great strength, the legs 11 and struts 15 being preferably formed of metal. While the form of the invention herein set forth is believed to be preferable, it will be understood that minor changes may be made therein without departing from the spirit and scope of the invention as claimed.

What I claim as new is:—

1. A hay support comprising a triangular plate, ball and socket joints beneath the plate adjacent the corners thereof, legs attached to said joints having pointed lower ends adapted for seating in the ground, ball and socket joints carried by corresponding sides of said legs equally spaced from the pointed ends thereof, struts attached to the last named joints and a plurality of hooks upon the legs beneath the strut connections adapted for receiving the unconnected portions of the struts therein when the device is set up for use.

2. A hay support comprising a triangular plate, legs pivotally connected adjacent the corner of the plate and having pointed free ends, a plurality of hooks upon the outer sides of the legs and struts pivotally connected to the legs, adjacent corresponding ends of the struts adapted for resting with their opposite free end portions adjustably upon said hooks.

3. A device of the class described comprising a plate, a plurality of legs pivoted beneath the plate, connections upon the legs each comprising a ring secured at corresponding points upon the legs, a socket swiveled to each ring, a ball adapted for turning in the socket and a ring swivelly connected to the ball and struts secured through the ball carried rings adjustably mounted adjacent their opposite ends with the adjacent leg when the device is set up for use.

4. In combination with a triangular plate, legs pivoted thereto adapted for mounting upon the ground, a plurality of hooks upon the outer sides of the legs, ball and socket joints having corresponding ends secured to the legs above said hooks and side struts secured to the other ends of the joints adapted for adjustably positioning upon said hooks when the device is in use.

In testimony whereof I affix my signature.

MICHAL MAKOS.